(12) United States Patent
Pettersson et al.

(10) Patent No.: US 9,460,551 B2
(45) Date of Patent: Oct. 4, 2016

(54) METHOD AND APPARATUS FOR CREATING A DISOCCLUSION MAP USED FOR CODING A THREE-DIMENSIONAL VIDEO

(75) Inventors: Martin Pettersson, Vallentuna (SE); Björn Johansson, Bjärred (SE); Thomas Rusert, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 306 days.

(21) Appl. No.: 14/237,114

(22) PCT Filed: Aug. 6, 2012

(86) PCT No.: PCT/SE2012/050859
§ 371 (c)(1),
(2), (4) Date: Feb. 4, 2014

(87) PCT Pub. No.: WO2013/022401
PCT Pub. Date: Feb. 14, 2013

(65) Prior Publication Data
US 2014/0176553 A1    Jun. 26, 2014

Related U.S. Application Data

(60) Provisional application No. 61/521,938, filed on Aug. 10, 2011.

(51) Int. Cl.
*G06T 15/20* (2011.01)
*G06T 11/00* (2006.01)
(Continued)

(52) U.S. Cl.
CPC ............. *G06T 15/20* (2013.01); *G06T 11/001* (2013.01); *H04N 13/0011* (2013.01);
(Continued)

(58) Field of Classification Search
CPC ................ H04N 13/0011; H04N 13/0022; H04N 19/597; H04N 13/0018; H04N 13/0048; H04N 19/46; H04N 19/553; H04N 13/0066; H04N 13/0242; H04N 19/00545; H04N 19/132; H04N 19/167; H04N 19/176; H04N 19/51; H04N 19/70; G06T 11/001; G06T 15/10; G06T 15/20; G06T 2207/10021; G06T 2207/30108; G06T 7/0075; G06T 7/0077
See application file for complete search history.

(56) References Cited

U.S. PATENT DOCUMENTS 6,754,278 B1 * 6/2004 Suh .................. H04N 19/56
375/240.27
8,135,068 B1 * 3/2012 Alvarez ............ H04N 19/176
375/240.12

(Continued)

FOREIGN PATENT DOCUMENTS

EP    2175663 A1    4/2010
EP    2451164 A1    5/2012
(Continued)

OTHER PUBLICATIONS

Bosc, Emilie, et al. "Towards a New Quality Metric for 3-D Synthesized View Assessment." IEEE Journal of Selected Topics in Signal Processing. vol. 5, No. 7. Nov. 2011. pp. 1332-1343.
(Continued)

*Primary Examiner* — Sultana M Zalalee
(74) *Attorney, Agent, or Firm* — Patent Portfolio Builders, PLLC

(57) ABSTRACT

It is presented a method for creating a disocclusion map used for coding a three-dimensional, 3D, video, the method comprises receiving (800) a pixel-based disocclusion map in which pixels are marked either as disoccluded or not. A block-based disocclusion map is derived (802) based on the pixel-based disocclusion map. An area of the block-based disocclusion map that has been marked as disoccluded is extended (804). It is also presented an encoder (30), a decoder (32) and a system for creating the disocclusion map.

32 Claims, 4 Drawing Sheets

(51) Int. Cl.
*H04N 13/00* (2006.01)
*H04N 19/597* (2014.01)
*H04N 19/176* (2014.01)
*H04N 19/132* (2014.01)
*H04N 19/167* (2014.01)
*H04N 19/553* (2014.01)

(52) U.S. Cl.
CPC ..... *H04N 13/0022* (2013.01); *H04N 13/0048* (2013.01); *H04N 19/132* (2014.11); *H04N 19/167* (2014.11); *H04N 19/176* (2014.11); *H04N 19/597* (2014.11); *H04N 19/553* (2014.11)

(56) References Cited

U.S. PATENT DOCUMENTS

| | | | |
|---|---|---|---|
| 2006/0029134 A1* | 2/2006 | Winder | H04N 13/0011 375/240.12 |
| 2010/0020884 A1* | 1/2010 | Pandit | H04N 19/597 375/240.25 |
| 2010/0195716 A1* | 8/2010 | Klein Gunnewiek | H04N 19/597 375/240.08 |
| 2011/0148858 A1* | 6/2011 | Ni | H04N 13/0011 345/419 |
| 2011/0267348 A1 | 11/2011 | Lin et al. | |
| 2011/0293179 A1 | 12/2011 | Dikmen et al. | |
| 2012/0008672 A1 | 1/2012 | Gaddy et al. | |
| 2012/0120192 A1 | 5/2012 | Alregib et al. | |

FOREIGN PATENT DOCUMENTS

| | | |
|---|---|---|
| WO | 2009001255 A1 | 12/2008 |
| WO | 2010037512 A1 | 4/2010 |
| WO | 2012010220 A1 | 1/2012 |
| WO | 2012062652 A1 | 5/2012 |

OTHER PUBLICATIONS

Cheng, Chia-Ming, et al "Spatio-Temporally Consistent Novel View Synthesis Algorithm From Video-Plus-Depth Sequences for Autostereoscopic Displays." IEEE Transactions of Broadcasting. vol. 57, No. 2. Jun. 2011. pp. 523-532.

Unknown, Author. "Advanced video coding for generic audiovisual services." International Telecommunication Union. Telecommunication Standardization Sector of ITU. Series H: Audiovisual and Multimedia Systems. Infrastructure of audiovisual services—Coding of Moving Video. H.264. Mar. 2010.

Sun, Wenxiu, et al. "Error Compensation and Reliability Based View Synthesis." ICASSP. IEEE 2011. pp. 1349-1352.

Unknown, Author. "Vision on 3D Video." International Organization for Standardisation. Video and Requirements. ISO/IEC JTC1/SC29/WG11 N10357. Lausanne, Switzerland. Feb. 2009.

Daribo, Ismael et al., "A Novel Inpainting-Based Layered Depth", IEEE Transactions on Broadcasting, vol. 57, No. 2, Jun. 2011, 533-541.

Smolic, Aljoscha, "An Overview of Available and Emerging 3D Video Formats and Depth Enhanced Stereo as Efficient Generic Solution", IEEE Picture Coding Symposium, May 6-8, 2009, 1-4.

Zinger, S. et al., "Free-viewpoint depth image based rendering", Elsevier, J. Vis. Commun. Image R. 21, 2010, 533-541.

* cited by examiner (Without temporal extension)

(With temporal extension)

METHOD AND APPARATUS FOR CREATING A DISOCCLUSION MAP USED FOR CODING A THREE-DIMENSIONAL VIDEO

TECHNICAL FIELD

Embodiments of the present disclosure generally relate to a method for creating a disocclusion map used for coding a three-dimensional (3D) video. The present disclosure also relates to an encoder, a decoder and a system for creating a disocclusion map.

BACKGROUND

3D Video or 3D TV is gaining increasing momentum in recent years. A number of standardization bodies (ITU, EBU, SMPTE, MPEG, and DVB) and other international groups (e.g. DTG, SCTE), are working toward standards for 3D TV or Video. Quite a few broadcasters have launched or are planning to launch public Stereoscopic 3D TV broadcasting.

Several 3D video coding schemes have been proposed as revealed by A. Smolic et al. in "An Overview of Available and Emerging 3D Video Formats and Depth Enhanced Stereo as Efficient Generic Solution", Proceedings of $27^{th}$ Picture Coding Symposium (PCS 2009), May 6-8, 2009, Chicago, Ill., USA. Among them are Video plus depth (V+D), Multiview Video (MVV), Multiview Video plus Depth (MVD), Layered Depth Video (LDV), and Depth Enhanced Video (DES).

In multiview video (e.g. for autostereoscopic displays), a number of views are required at the receiver side. The trend seems to be that the more advanced the autostereoscopic technology becomes, the more views are being used. Recently an autostereoscopic screen with 28 views has been released. Obviously, transmitting all of these views over a channel or network demands too much bandwidth (too high bit rates), hence it is less practical. Therefore, it is desirable, see Video and Requirements Group, "Vision on 3D Video," ISO/IEC JTC1/SC29/WG11 N10357, Lausanne, C H, February 2008 (http://www.chiariglione.org/mpeg/visions/3dv/index.htm), to send only a small number of views (e.g. 2 or 3) while the other views are synthesized at the receiver side. Similarly, in free viewpoint 3D TV or video, the number of views that need to be available at the receiver side is very large, since it depends on the position or viewing angle of the viewer relative to the display. So it is impossible to transmit all the possible views from the sender. The only sensible way is to synthesize many virtual views from a limited number of views that are sent over the channel/network.

An example of a view synthesis system 10, which is one of the key technologies involved in multiview or free viewpoint 3D video, is illustrated in FIG. 1. The system comprises a processor or CPU 12, a memory 14 and input/output interfacing circuitry 16. As input to the view synthesis system there are usually two or three reference images (I_i), the corresponding depth maps (D_i) and the camera parameters. From this data one may synthesize images from new viewpoints (I_new) using standard techniques to transfer pixels from one image to another.

Synthesizing a new view can actually be performed using only one image and the corresponding depth map. Using less image information may achieve lower bitrates in the transmission. However, it is then likely that there will be areas in the synthesized image where there is no information. This typically happens where the background is occluded by a foreground object in the reference image but is visible in the synthesized new image, or along a side of the synthesized image 22, cf. the grey shaded pixels of the foreground object 20 in the left hand view of FIG. 2. In order to handle this problem image and depth information from a second view is used; from which second view the occluded area is visible. This is the reason why more than one image usually is used in the synthesis.

In one approach one full image texture+depth together with only parts of the other images+depths are needed in order to cope with the holes 26 in the synthesized image due to occlusions, cf. right hand side of FIG. 2. These are called sparse images 24 and depths since they only contain valid information in certain areas in the image. When a new image is synthesized, all pixels in the full reference image are transferred to positions of the new image and the areas containing the valid pixels from the sparse images are transferred to other positions of the new image. All together the transferred pixels create a complete new image without holes.

The sparse representation approach is illustrated in the view synthesis system 10 of FIG. 3. The scheme illustrates a scenario with two input reference views, but it could easily be extended to N (e.g. 3) input reference views. The left depth map is encoded using a Multi View (MV) encoder 30 such as Multi View Codec (MVC), an extension to H.264. Future MV codec's based on for instance the High Efficiency Video Codec (HEVC), are also an option as well as using simulcast coding. The reconstructed left depth map is fed into the disocclusion detection system which outputs a disocclusion map with pixels marked as either disoccluded or not. The full and sparse views for texture and the sparse view for depth are then encoded with the disocclusion map indicating which blocks that need to be encoded and which blocks that can be skipped.

At the decoder 32 side, texture and depth are decoded using standard MV decoders. The reconstructed left depth map is fed into the disocclusion detection system which outputs an identical disocclusion map to what was used in the encoder 30. Since the disocclusion map is derived identically in the encoder 30 side and the decoder 32 side, without sending it explicitly, this approach is denoted as "implicit disocclusion map signaling".

An alternative to having the disocclusion detection in the decoder (i.e., implicit disocclusion map signaling) would be to signal the disocclusion map explicitly to the view synthesis system. An advantage with this would be that the disocclusion detection could be run using the uncompressed reference depth map as well as the uncompressed reference video. An advantage with the solution described in FIG. 3 is of course that no extra bits are needed for the disocclusion map.

Finally, the view synthesis system 10 takes the decoded texture and depth and the disocclusion map in order to create the required output views. The disocclusion map is here needed for the view synthesis system to know what parts of the sparse texture can be used for creating each output view.

In order to use sparse representation, the encoder 30 and decoder 32 need to know what blocks to encode and what blocks that can be skipped. Blocks which are fully or partially disoccluded need to be encoded and sent. Disoccluded areas must thus be detected.

As described in European patent application no. 10190368.0, disocclusion detection may be performed by utilizing only the depth maps of the corresponding views. Instead of searching for disoccluded areas in 2D images, this approach derives the disoccluded areas through 3D geometric calculations. The advantage with this solution is that the view synthesis can be more easily performed on the decoding side without having to submit the disocclusion map explicitly. It is also less sensitive to texture noise than 2D image based approaches.

The key equation for disocclusion detection in European patent application no. 10190368.0 is given as follows.

$$1/z_0 - 1/z_1 > T/(au*s_H)$$

Here, $z_0$ and $z_1$ denote depth values associated with two neighboring pixels, au is the camera focal length, and $s_H$ is the relative horizontal translation between the reference camera and the virtual camera. Both au and $s_H$ are determined through the camera parameters. T is a threshold that is indicative of a lower boundary for a number of neighboring disoccluded pixels that are detected by the algorithm, i.e. the above condition is true if a hole of more than T pixels width is detected.

SUMMARY

Even though the disocclusion detection solution described in European patent application no.10190368.0 is less sensitive to texture noise than solutions based on 2D image searching, the result is dependent on having depth maps of rather high quality. Low quality depth maps may cause quite perceptible image artifacts such as flickering and abnormalities at and around object borders.

The present disclosure relates to mechanisms that address at least some of the problems and issues described above.

According to one aspect, a method is provided for creating a disocclusion map used for coding a 3D video. The method comprises receiving a pixel-based disocclusion map in which pixels are marked either as disoccluded or not. A block-based disocclusion map is derived based on the pixel-based disocclusion map. An area of the block-based disocclusion map that has been marked as disoccluded is extended.

In a preferred embodiment the extension of the area of the block-based disocclusion map is made spatially by extending said area with at least one block.

In another preferred embodiment the extension of the area of the block-based disocclusion map is made temporally by keeping said area marked as disoccluded for a certain duration even if said area is no longer disoccluded.

In yet another preferred embodiment the resolution of the block-based disocclusion map is reduced such that it matches the block structure of the video codec used.

In other embodiments the step of extending the area of the block-based disocclusion map is made with an equal number of blocks in all directions from the disoccluded area or based on an estimation of the likelihood for having an artifact in a certain direction and the extension of blocks is weighted accordingly.

According to a second aspect there is provided an encoder, which comprises a processor and a memory storing software comprising computer program code which, when run in the processor causes the encoder to receive a pixel-based disocclusion map in which pixels are marked either as disoccluded or not; derive a block-based disocclusion map based on the pixel-based disocclusion map; extend an area of the block-based disocclusion map that has been marked as disoccluded is.

According to a third aspect there is provided a decoder, which comprises a processor and a memory storing software comprising computer program code which, when run in the processor causes the decoder to receive a pixel-based disocclusion map in which pixels are marked either as disoccluded or not; derive a block-based disocclusion map based on the pixel-based disocclusion map; extend an area of the block-based disocclusion map that has been marked as disoccluded is.

According to a fourth aspect there is provided a view synthesize system, which comprises a processor and a memory storing software comprising computer program code which, when run in the processor causes the decoder to receive a pixel-based disocclusion map in which pixels are marked either as disoccluded or not; derive a block-based disocclusion map based on the pixel-based disocclusion map; extend an area of the block-based disocclusion map that has been marked as disoccluded is.

In preferred embodiments the encoder, the decoder and the system are further caused to extend the area of the block-based disocclusion map spatially by extending said area with at least one block. In yet other embodiments the encoder, the decoder and the system are further caused to extend the area of the block-based disocclusion map temporally by keeping said area marked as disoccluded for a certain duration even if said area is no longer disoccluded.

In other embodiments the encoder and decoder may both comprise pre-agreed disocclusion detection parameters or such parameters may be transmitted dynamically for example once per video sequence or for each video frame.

Thus, according to embodiments of the present disclosure the perceptible problems due to bad depth maps are solved by extending the area that has been marked as disoccluded. By doing so, and which has been confirmed in experiments, the bit rate for transmitting disocclusion information is increased slightly but the perceptible and annoying image artifacts at and around object borders are resolved.

Embodiments of the present disclosure also solves the annoying flickering problem by keeping areas marked as disoccluded for certain duration even though they are no longer disoccluded. This creates temporal stability in the 3D video which is more pleasing to look at.

BRIEF DESCRIPTION OF THE DRAWINGS

These and other aspects, features and advantages will be apparent and elucidated from the following description of embodiments, reference being made to the accompanying drawings, in which.

DETAILED DESCRIPTION

To better understand the present disclosure some definitions will be made. In an image there may be an object present that obstructs a viewer in a first from seeing what is behind that object in the background. From the viewers position we have no information about what is behind the object. This is called that the background is occluded by the object. If the viewer now is in a second position the background may be revealed. Areas in a view that are occluded from one view but visible from another view are called disoccluded. Such disoccluded areas are important since without information of disoccluded areas it is not possible to reconstruct an image from one view and a depth map. The disoccluded areas may be rendered in a disocclusion map.

A disocclusion map is created by performing disocclusion detection. The result of such disocclusion detection is a pixel-based disocclusion map, in which pixels are marked either as disoccluded or not. The resolution of such pixel-based disocclusion map is high and might also require a high band width when sending it.

Figure 4:
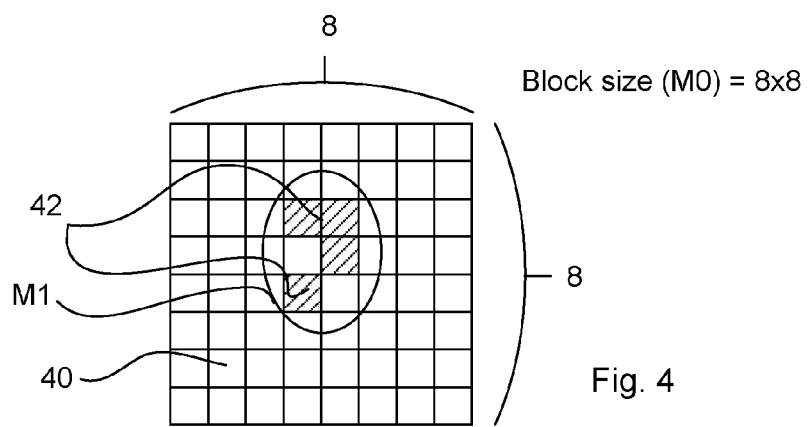
FIG. 4 is a schematic view showing the definition of a block and block size.

The pixel-based disocclusion map may be used to derive a block-based disocclusion map. This is best explained in conjunction with FIG. 4. In FIG. 4 one block 40 is shown. The block 40 has a block size, M0, that is 8×8 pixels, i.e. totally 64 pixels. As may be seen some of these pixels 42 are dashed. In this example there are four dashed pixels 42. These four pixels are disocclusion pixels 42. When using a block-based disocclusion map, the whole block 40 may be marked or declared as disoccluded if at least one or a fraction, M1, of the pixels are disoccluded. In this example it takes four pixels, M1, to declare the whole block 40 as disoccluded.

Since block based video encoders set the type of coding (intra, inter, skip, etc) at macro block level, it makes sense to align the resolution of the disocclusion map with the borders of the macro blocks. The disocclusion map will thus have the resolution of the video divided by the size of the macro block. By doing so, no pixels marked as "don't care" (not disoccluded) will be encoded in vain. For the H.264 codec, the macro block size is 16×16 pixels and for the HEVC codec being standardized within the Joint Collaboration Team on Video Coding (JCT-VC) the maximum block unit size is typically 64×64 pixels. In the preferred embodiment of our invention, the block size used in the disocclusion map will have the same macro block size as the encoder. But other block sizes would also be possible, including single pixels (=1×1 blocks).

Figure 1:
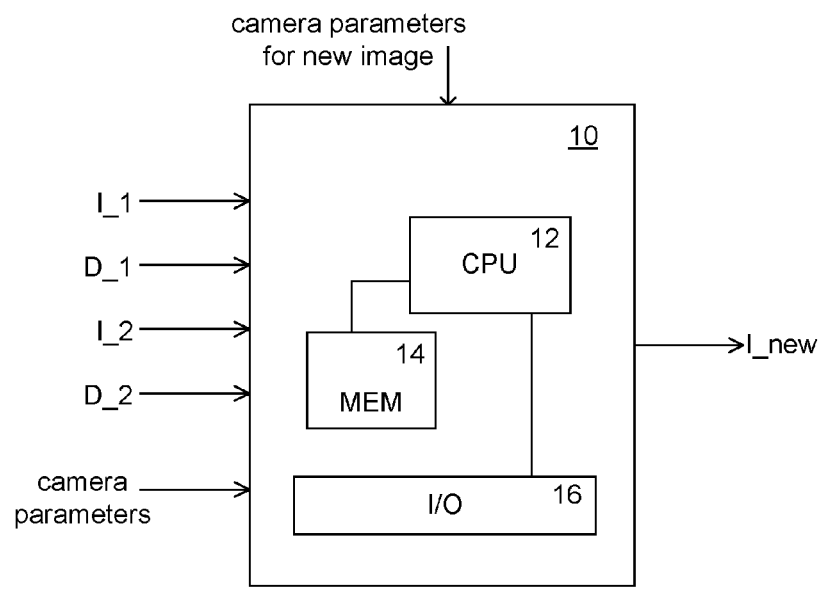
FIG. 1 is a schematic diagram of a view synthesizes system.
Figure 2:
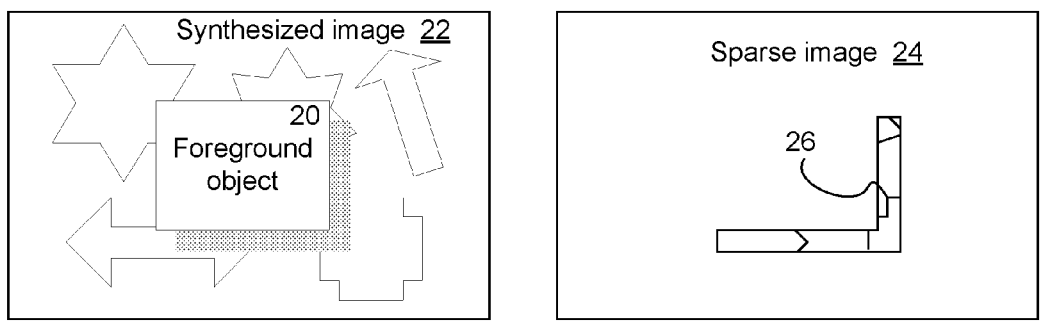
FIG. 2 is a schematic view of a synthesized image containing occluded areas and sparse image containing information not available in the synthesized image.

Embodiments of the present disclosure extend the area that has been marked as disoccluded in order to get rid of annoying image artifacts. This is done both spatially and temporally. Embodiments of the present disclosure may be performed in a view synthesize system 10 as described above in conjunction with FIGS. 1 and 3 or in an encoder 30 or decoder 32 as described in conjunction with FIG. 3. Further to the description above the encoder 30 and decoder 32 also comprise controllers 34, 38 and 36, 39 respectively. It should be understood that software is stored in the memories 14, 36, 39, which software comprises computer program code which, when run in the processors 12, 34, 38, causes the system 10, the encoder 30 and the decoder 32 to perform the method according to various embodiments of the present disclosure.

Figure 5:
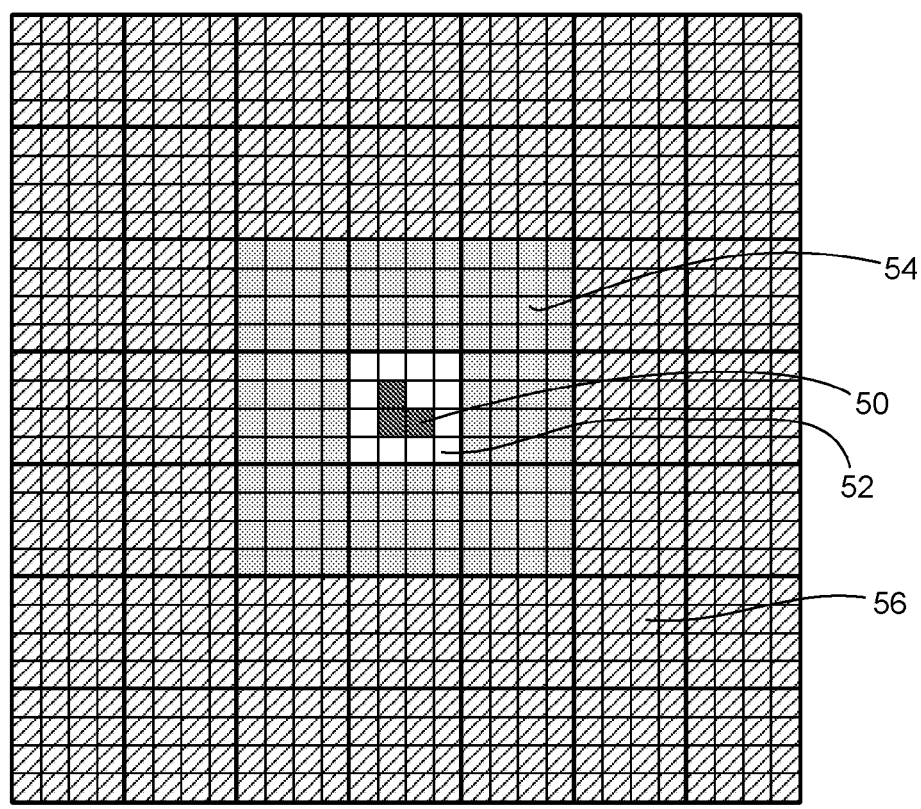
FIG. 5 is an example of a spatial extension of a block-based disocclusion map.

First spatial extension of a disoccluded area will be described. When the depth maps have rather low quality, it may not be sufficient to use the macro block size as the disocclusion block size to cover up the object border artifacts. Instead of just increasing the block size for the disocclusion map, the disoccluded area can be increased by extending the area initially detected as disoccluded in all directions. An example of how it can look with different area extensions is shown in FIG. 5. Each block in FIG. 5 is for illustrative purposes made up of 4×4 pixels, but may in reality as mentioned above be 16×16 or 64×64 pixels depending on the codec used for coding the 3D video representation. In the centre of FIG. 5 there is a white block 52 having three dark grey pixels 50 that are disoccluded. Thus, it is declared that this white block 52 is disoccluded. A block may be considered to be disoccluded as soon as one pixel within this block is disoccluded. However, one might also use that a fraction, such as 1%, of the pixels have to be disoccluded in order for the whole block to be disoccluded, as described above in conjunction with FIG. 4. In a first embodiment the disoccluded block 52 may be extended by also marking the immediate surrounding light grey blocks 54 as disoccluded, i.e. totally an area of 9 blocks will be marked as disoccluded.

In yet another embodiment the area marked as disoccluded may be even further extended by marking three blocks 56 in each direction, i.e. totally 49 blocks will be marked as disoccluded, shown in FIG. 5 as dashed blocks 56 together with the light grey blocks 54 and the white block 52 in the centre.

Figure 6:
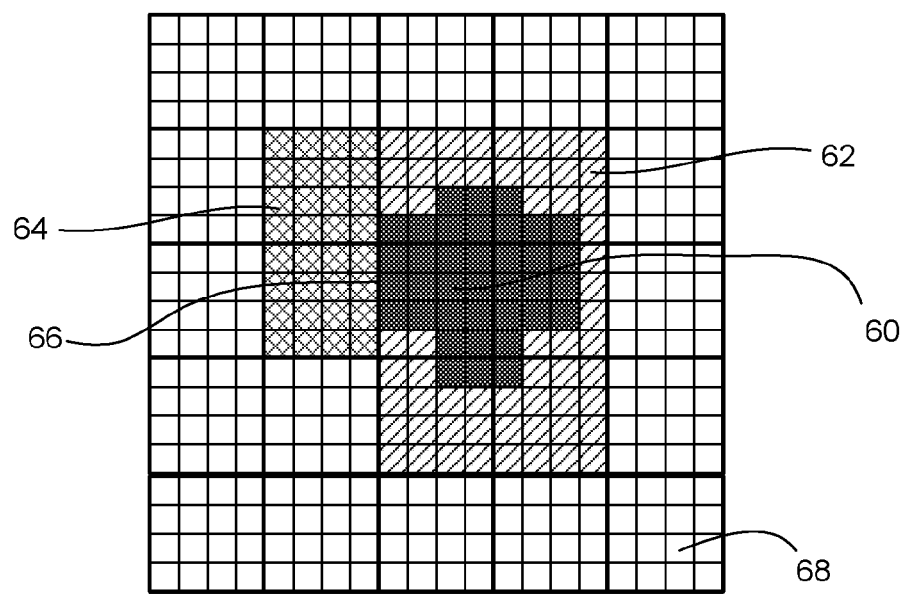
FIG. 6 is an example of a spatial extension of a block-based disocclusion map in a weighted direction of likelihood.

In an alternative embodiment of the present disclosure, the likelihood for having an artifact in a certain direction is estimated and the area extension is weighted accordingly. An example of this is shown in FIG. 6, in which the border 66 of the disoccluded area is in line with the macro block border used by the encoder, and there is not a sufficiently large area where the sparse image and full image overlap to properly blend the full and the sparse image. The white blocks 68 are blocks only present in the full image, the black cross shape 60 is the disoccluded area with pixels only in the sparse image, and the dashed area blocks 62 are blocks that have pixels in both the full and the sparse image. This is an example of when a proper blending of the full and the sparse image cannot be made, which may result in blocking artifacts. The solution is to extend the sparse area in the bordering directions. To solve this problem, the sparse area can be extended before the encoding in positions where the disoccluded area is close to the macro block border so that a proper blending of the sparse and full images can be performed. This is illustrated with shaded blocks 64 in FIG. 6.

Now that spatial extension has been described it is time to describe temporal extension. Depth maps of lower quality could be temporally inconsistent depending on how they were created. Computer generated sequences usually don't have this problem, but it may be present where the depth maps have been created from recorded video. For example if a scene with balloons on a string is recorded the string may disappear and comes back due to bad depth map estimation. Coded depth maps will have more problems with instability compared to uncoded.

Figure 7:
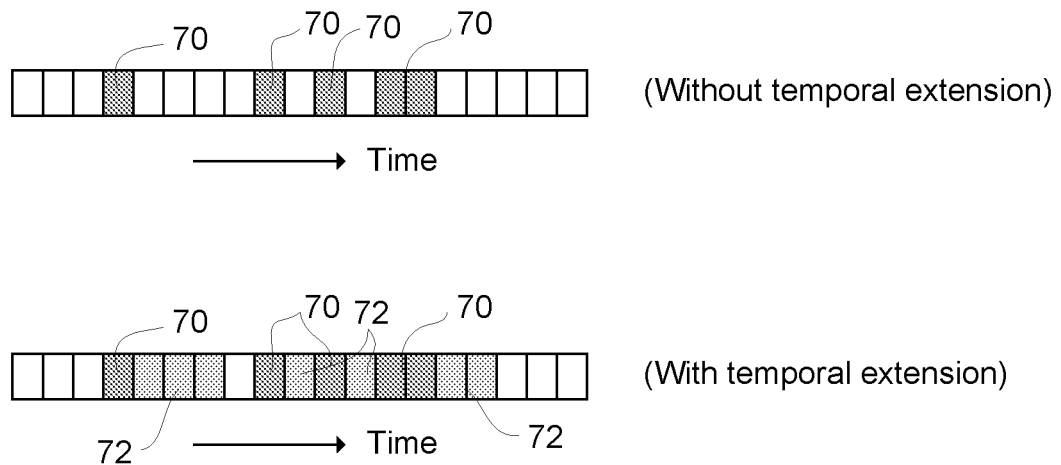
FIG. 7 is an illustration of temporal extension.

Temporal instability in depth maps is especially a problem when sparse representation is used, even though it also can be visible when not using sparse representation. The problem with temporal instability in the depth map when using sparse representation is that areas in the disocclusion map can be selected and deselected frequently which in turn will cause annoying flickering artifacts in the video as the texture is alternating taken from the right and the left view. How the selection of detected disocclusions 70 could look like in the temporal domain is illustrated in upper part of FIG. 7. The idea of embodiments in the present disclosure is to stabilize the disocclusion map by preventing areas to be deselected too fast. In the preferred embodiment a counter is assigned to each block in the disocclusion map. The counter counts the number of frames since disocclusion was last detected. The counter is increased for each frame not having the corresponding block marked as disoccluded, but reset when the corresponding block is marked as disoccluded. Thus, each counter is used for determining the duration for keeping the area of the block-based disocclusion map marked as disoccluded.

Using a sliding window approach, it is determined if a block not marked as disoccluded should instead be marked as disoccluded. If the counter is below a certain threshold (window size), the block is marked as disoccluded. In practice, as we found experimentally, a good compromise between quality and bit rate usage is to have a window size equal to about one second. The solution is illustrated in the lower part of FIG. 7 where the size of the window is four frames. Frames that have not been recognized as disoccluded but are marked as disoccluded are denoted 72 in FIG. 7. Initially, the counter should start with the window size to prevent unnecessary selection of disoccluded areas.

If the video stream contains key frames (i.e. frames where random access to the compressed 3D video is enabled, e.g. in TV broadcast systems), the counters could be aligned with them by setting the counter of the key frame to the window size, exactly as for the first frame. In an alternative embodiment, motion tracking is used to determine for which block in the spatial dimension each counter belongs to.

It has been observed that the relative quality impact of the object boundary and the flickering artifacts are visually worse when otherwise the encoded video quality is good, i.e. when the video bit rate is high. Thus more spatial and temporal extension of disoccluded areas should be applied if the video bit rate is otherwise high. An alternative is therefore to use a function for determining when and to what extent the area should be extended. This can be expressed as $$[E,t]=f(QP)$$

where E is the number of blocks to extend the disoccluded area within the spatial domain, t the duration in frames or seconds to delay the deselection of the disoccluded areas in the temporal domain (i.e., the window size), QP the quantization parameter indicative for the encoded video quality and f an appropriate function. Appropriate functions could for instance be $$E = [\alpha \cdot (QP_{max} - QP)], t = \{\beta \cdot (QP_{max} - QP)] \text{ or}$$
$$E = [\alpha \cdot \log(QP_{max} - QP)], t = \{\beta \cdot \log(QP_{max} - QP)] \text{ or}$$
$$\begin{cases} E = 0 & \text{if } QP < x \\ E = 1 & \text{if } OP \geq x, \end{cases} \begin{cases} t = 0 & \text{if } QP < y \\ t = [\beta \cdot (QP_{max} - QP)] & \text{if } QP \geq y \end{cases}$$

Here, QP is indicative for the quantization step size, i.e. the video quality decreases as QP increases, and $QP_{max}$ is for instance a maximum value for QP in the respective video codec.

Figure 8:
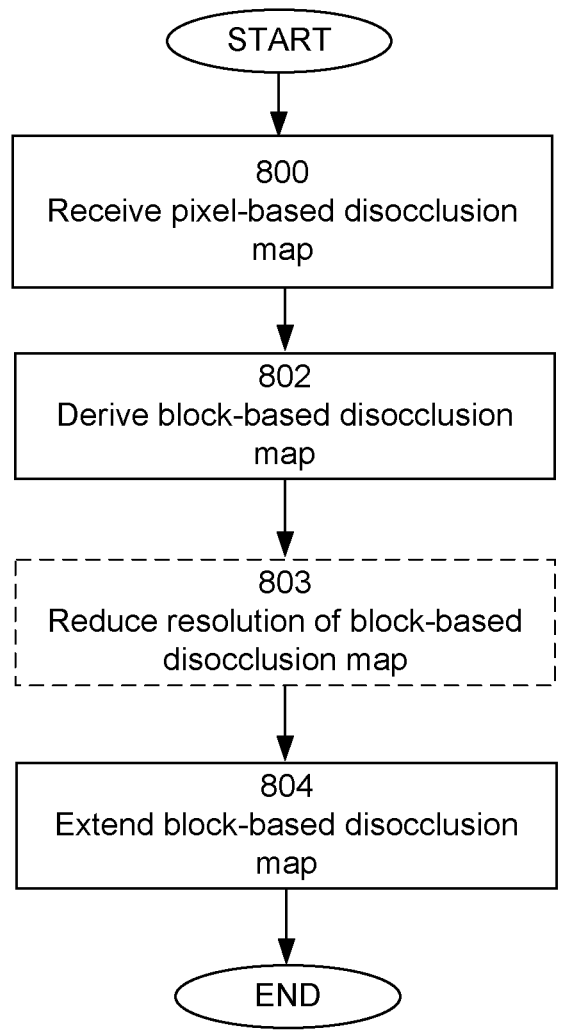
FIG. 8 is a flow chart showing a method for determining disoccluded areas.

As indicated above, there may be several parameters that configure the exact operation of the disocclusion detection. The method for extending the disocclusion map used for coding a 3D, video is depicted in FIG. 8.

The basic disocclusion detection step has been described above and especially with reference to European patent application no. 10190368.0 and it is configured by the "pixel threshold" T. This step allows for detection of disoccluded pixels. The resolution of the disocclusion map after this step is the same as the resolution of the depth map used for disocclusion detection. As also mentioned above the resolution of the disocclusion map can be reduced, e.g. in order to match the block structure of a video codec (e.g. 16×16 pixels). The block size may be denoted as M0. It is understood that subdivisions based on regions other than blocks would be possible, too. If a block-based disocclusion map is derived based on a pixel-based disocclusion map, then a third parameter is used to indicate the number (or fraction) of disoccluded pixels in a block necessary to declare a block as disoccluded. For instance, if 16×16 blocks are used, then each block comprises 256 potentially disoccluded pixels. One possibility would be to declare a block as disoccluded as soon as at least one pixel has been found in the respective block or 4 pixels or for example at least 1% of the pixels. For use of "sparse representation", it may be desirable to reduce the number of blocks declared as disoccluded, so as to increase the number of not encoded ("don't care") blocks. Also, it may be relatively simple for a view synthesis algorithm to fill isolated pixels with information derived from neighboring pixels (so-called "inpainting"). Thus, a block may only be declared as disoccluded if at least M1 pixels are found to be disoccluded within the block. Further conditions regarding the spatial relationship of disoccluded pixels (e.g. at least X neighboring pixels disoccluded) may be used as well.

Thus, after that the pixel-based disocclusion map has been created it is time it is according to embodiments of the present disclosure time to extend the disocclusion map. The method for extending the disocclusion map used for coding 3D video is depicted in FIG. 8. The method starts with step 800 in which a pixel-based disocclusion map is received by the view synthesizes system 10. This pixel-based disocclusion map may be created according to the description above or in any other suitable way. The pixel-based disocclusion map is used to derive a block-based disocclusion map in step 802. In step 804 the area of the derived block-based disocclusion map that has been marked as disoccluded is extended. This extension may as mentioned above be done in the spatial and/or in the temporal domain.

The "spatial extension parameter" E indicated above determines by how many blocks a disoccluded area is to be extended in the spatial direction. The "temporal extension parameter" t determines a temporal window to extend a disoccluded area. Some or all of the parameters above may also depend on other external parameters such as bit rate or quantization parameter of the video codec used for compression of the 3D video representation.

As in option in the method depicted in FIG. 8 the step of deriving 802 a block-based disocclusion map may further comprise reducing 803 the resolution of the block-based disocclusion map such that it matches the block structure of the video codec used.

As mentioned above it may be highly desirable in 3D video compression systems to have identical disocclusion maps available both at the encoder and decoder. If sparse representation is used, then the decoder/renderer will use the disocclusion map to find out which areas can be used for view synthesis and which areas should not be used ("don't care areas"). On the other hand, having knowledge about the decoder/renderer behavior (e.g. because the decoder/renderer behavior is specified in a rendering part of a system specification or standard), the encoder can assign bit rate according to the disocclusion map, e.g. encode disoccluded areas (holes) with high fidelity, and "don't care" areas with low bit rate (low fidelity). If in such system disocclusion maps would not be identical at encoder and decoder, then the decoder/renderer might use low fidelity blocks for rendering, which can lead to bad rendering quality, or the encoder might encode blocks with many bits that will actually never be used for rendering. Both effects are apparently undesirable, which is why identical disocclusion maps should be used.

Figure 3:
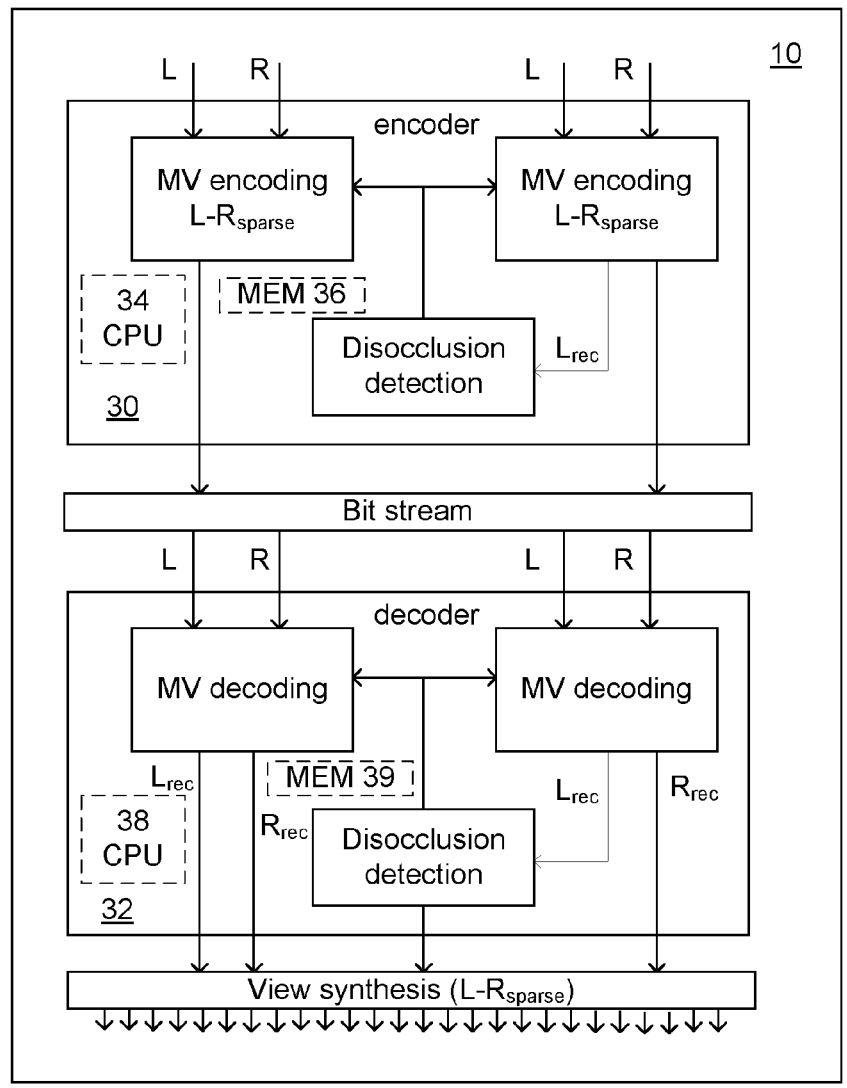
FIG. 3 is a more detailed view of the view synthesizes system.

Several parameters may be used to configure the disocclusion detection algorithm, and the exemplified parameters above should be understood as typical examples. As motivated in the paragraph above, the parameters for disocclusion detection should be used identically in the encoder side and the decoder side if implicit disocclusion map signaling is used. Additionally, the same depth maps should be used as input to the disocclusion detection algorithm. Since the decoder has only compressed depth maps available, the encoder needs to use the compressed depth maps as well. This is illustrated in FIG. 3.

In order to get the same disocclusion map, the disocclusion detection parameters may be pre-agreed between the encoder and the decoder. It may however be advantageous to agree the parameters dynamically. This way, the parameters could be chosen in a dynamic way that suits the video content to be compressed and thus leads to improved compression efficiency and/or rendering quality. This is in particular true if only few disocclusion detection parameters are sent, so that the amount of bit rate spent on disocclusion detection parameters is low compared to the bit rate spent on transmitted video and depth information.

It is proposed that the encoder selects the disocclusion detection parameters. It can do so based on knowledge of the uncompressed depth maps and video sequences, such as to optimize the trade-off between bit rate and rendering fidelity.

Parameters to be transmitted include the pixel threshold T, block size M0, block threshold M1, spatial extension E and temporal extension t, all exemplified above.

In one particular embodiment, the disocclusion detection parameters are sent in a so-called SEI message (supplemental enhancement information). Such SEI messages can be specified in the H.264/AVC video compression standard and also in the new video compression standard HEVC, which is currently under development. An example for such SEI message is given in the table below.

The table is specified in a way similar to the H.264/AVC video compression standard. The left column specifies the name of the variable sent in the SEI message; the right column specifies the descriptor, i.e. data format to represent the respective variable. See the H.264/AVC video compression standard for further information.

| partial_presentation_sei( payloadSize ) { | Descriptor |
|---|---|
| partial_presentation_flag | u(1) |
| if( partial_presentation_flag == 1 ) { | |
| disocc_detect_ref_depth_id | u(16) |
| prec_disocc_detect_pixel_thres | ue(v) |
| exponent_disocc_detect_pixel_thres | u(6) |
| mantissa_disocc_detect_pixel_thres | u(v) |
| log2_disocc_detect_block_size | ue(v) |
| disocc_detect_block_thres | ue(v) |
| disocc_detect_spatial_ext | ue(v) |
| disocc_detect_temporal_win | ue(v) |
| } | |
| } | |

In the example in the table, the "partial_presentation_flag" first indicates whether "sparse representation" and thus disocclusion detection is used at all. If this flag is not equal to "1", then the decoder may assume that there are no "don't care" areas at all, i.e. use all available pixel information for view synthesis. If sparse representation is used ("partial_presentation_flag" equal to 1), then the following parameters specify how to configure the parameters for the decoder-side disocclusion detection. The encoder sends this information and can thus make sure that the same parameters are used both at the encoder and the decoder.

The "disocc_detect_ref_depth_id" first indicates the depth map that is used for the disocclusion detection. This is necessary if multiple depth maps are present (e.g. for different camera views). The type of identifier depends on the way how sub-bit streams can be indicated in the given bit stream format. In the example here, a 16-bit identifier is assumed.

The "prec_disocc_detect_pixel_thres" along with the "exponent_disocc_detect_pixel_thres" and the "mantissa_disocc_detect_pixel_thres" indicate the precision and then exponent and mantissa of a floating point number indicating the "pixel threshold" T.

Finally, "log 2_disocc_detect_block_size" indicates the 2-logarithm of the "block size" M0, "disocc_detect_block_thres" indicates the "block threshold" M1, "disoccl_detect_spatial_ext" indicates the "spatial extension" E, and "disocc_detect_temporal_win" indicates the "temporal extension" t.

Further or alternative parameters to configure the disocclusion detection may be included as well. Furthermore, the parameters may be modified based on encoding bit rate or quantization parameters, either through a rule agreed by both encoder and decoder, or (preferably, as of flexibility reasons) by the encoder only, that then sends the respective parameters through e.g. the SEI message above to the decoder.

Finally, the disocclusion detection parameters may be signaled once per video sequence (i.e. in the beginning of the bit stream) or alternatively could be updated with every video frame, or even smaller fractions of a video frame (e.g. "slices" H.264/AVC video compression standard). It may also be dynamically decided whether to send the parameters. In the absence of a disocclusion detection parameter SEI message associated with a specific frame, the decoder may assume that the last received SEI message is valid. In the presence of a disocclusion detection parameter SEI message, the decoder may assume that the message includes a parameter update that replaces previously received parameters.

When explicit disocclusion map signaling is used, i.e. the disocclusion map is generated at the encoder and transmitted to the decoder in explicit form then the disocclusion detection algorithm can make use of data that would not be available at the decoder side. Examples for such additional data to be used include original (uncompressed) depth maps and original (uncompressed) video data.

The advantage of using original depth data may be that compared to compressed depth data, it may contain less noise, and thus allow for more accurate disocclusion detection.

Regarding use of original video data, if e.g. an original representation of two videos (left and right) and two corresponding depth maps (left and right) are available, then the encoder can run an algorithm as follows:

1. Use left depth maps to project left video into the camera location of the right view, i.e. perform view synthesis from left texture/depth to the right camera location.
2. Compare the synthesized result with the original right video view. If the synthesized result is sufficiently similar to the original right video view, then classify the corresponding area in the right view as "don't care" area, so as to encode them at low bit rate. If the synthesized result is not sufficiently similar to the original right video view, then classify the corresponding area in the right view as "disoccluded", so as to encode them at good fidelity. Likewise, classify all "hole" areas, i.e. all areas in the synthesized right view where no pixels from the left view have been projected, as "disoccluded".

It is understood that instead of projecting from the left view to the right view, projecting from the right view to the left view or any other setup with more than two views could be used as well.

The similarity between the synthesized and the original view can be measured e.g. by means of "mean squared error" (MSE) or "peak signal to noise ratio" (PSNR). However, slightly inaccurate depth maps in the reference view can lead to slight pixel shifts in the synthesized view, which may lead to high MSE (low PSNR) indicative of low synthesis quality, although the subjective visual impression may be good. It may thus be advisable to use alternative quality measures that measure structural similarities rather than pixel similarities as MSE and PSNR do. An example for a structural similarity measure is the "structural similarity index" (SSIM).

In another variant, the absolute value of depth is also taken into account when performing disocclusion detection for explicit disocclusion map signaling. That is, pixels that are closer to the viewer (lower depth value) can be preferably classified as disoccluded. This is to guarantee that objects that are close to the viewer and thus "visually important" will be transmitted in the "sparse representation", so as to exhibit good synthesis fidelity. Such strategy may for example be realized by making the similarity threshold indicated above as a function of the associated depth value, i.e. require higher similarity for pixels "close" to the viewer for classifying them as "don't care".

The advantage of embodiments of the present disclosure is that by extending the areas of the disoccluded areas, annoying object border artifacts can be reduced or removed at the cost of just a minor increase in bit rate. By also extending the disoccluded area in time, a more stable video can be achieved where otherwise flickering image artifacts could be present. Embodiments of the present disclosure are targeting an encoding scheme with sparse representation. Similarly, layered depth video systems (LDV) where only parts of a transmitted video frames are valid for synthesis may be targeted. The invention could also be applicable for other applications where disocclusion maps are deployed.

Although the present invention has been described above with reference to specific embodiments, it is not intended to be limited to the specific form set forth herein. Rather, the invention is limited only by the accompanying claims and, other embodiments than specified above are equally possible within the scope of the appended claims. In the claims, the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Reference signs in the claims are provided merely as a clarifying example and should not be construed as limiting the scope of the claims in any way.

The invention claimed is:

1. A method, performed by a processor in a view synthesis apparatus, for creating a disocclusion map used for coding a three-dimensional (3D) video, the method comprising:
    receiving, by the processor, from a disocclusion detection system, a pixel-based disocclusion map in which pixels are marked either as disoccluded or not;
    deriving, by the processor, a block-based disocclusion map based on the pixel-based disocclusion map;
    extending, by the processor, an area of the derived block-based disocclusion map, which has been marked as disoccluded, temporally by keeping said area marked as disoccluded for a particular duration even if said area is no longer disoccluded; and
    coding, by the processor, the three-dimensional (3D) video by using the extended block-based disocclusion map.

2. The method of claim 1, wherein deriving the block-based disocclusion map further comprises reducing the resolution of the block-based disocclusion map such that it matches the block structure of the video codec used.

3. The method of claim 1, wherein extending the area of the derived block-based disocclusion map is performed spatially by extending said area with at least one block.

4. The method of claim 3, wherein spatially extending the area of the derived block-based disocclusion map comprises extending the area by an equal number of blocks in all directions from the disoccluded area.

5. The method of claim 3, wherein spatially extending the area of the derived block-based disocclusion map is performed based on an estimation of the likelihood for having an artifact in a certain direction and wherein the extension of blocks is weighted accordingly.

6. The method of claim 1, further comprising the step of assigning a disocclusion counter to each block in the area of the block-based disocclusion map, said counter being used for determining the duration for keeping the area of the block-based disocclusion map marked as disoccluded.

7. The method of claim 6, wherein motion tracking is used to determine for which block in the spatial domain each assigned disocclusion counter belongs to.

8. The method of claim 1, wherein extending the area of the derived block-based disocclusion map is performed in dependence on the encoded video quality.

9. The method of claim 1, wherein the method is performed in an encoder and further comprises assigning a bit rate according to the extended block-based disocclusion map such that disoccluded areas are encoded with high fidelity and non-disoccluded areas are encoded with low fidelity.

10. The method of claim 9, further comprising dynamically sending disocclusion detection parameters from the encoder to a decoder.

11. The method of claim 10, wherein sending the disocclusion detection parameters is made once per video sequence or once for each video frame.

12. The method of claim 10, wherein the step of sending the disocclusion detection parameters is made in a Supplemental Enhancement Information (SEI) message.

13. An encoder for creating a disocclusion map used for coding a three-dimensional (3D) video, the encoder comprising a processor and a non-transitory memory storing software comprising computer program code that, when run in the processor, causes the encoder to:
    receive, from a disocclusion detection system, a pixel-based disocclusion map in which pixels are marked either as disoccluded or not,
    derive a block-based disocclusion map based on the pixel-based disocclusion map,
    extend an area of the derived block-based disocclusion map that has been marked as disoccluded, temporally by keeping said area marked as disoccluded for a certain duration even if said area is no longer disoccluded, and
    code the three-dimensional (3D) video by using the extended block-based disocclusion map.

14. The encoder of claim 13, the software further comprising program code that, when run in the processor, causes the encoder to reduce the resolution of the derived block-based disocclusion map such that it matches the block structure of the video codec used.

15. The encoder of claim 13, the software further comprising program code that, when run in the processor, causes the encoder to spatially extend the area of the derived block-based disocclusion map by extending said area with at least one block.

16. The encoder of claim 15, the software further comprising program code that, when run in the processor, causes the encoder to spatially extend the area of the derived block-based disocclusion map with an equal number of blocks in all directions from the disoccluded area.

17. The encoder of claim 15, the software further comprising program code that, when run in the processor, causes the encoder to spatially extend the area of the derived block-based disocclusion map based on an estimation of the likelihood for having an artifact in a certain direction and to weight the extension of blocks accordingly.

18. A decoder for creating a disocclusion map used for coding a three-dimensional (3D) video, the decoder comprising a processor and a non-transitory memory storing software comprising computer program code that, when run in the processor, causes the decoder to:
  receive from a disocclusion detection system, a pixel-based disocclusion map in which pixels are marked either as disoccluded or not,
  derive a block-based disocclusion map based on the pixel-based disocclusion map,
  extend an area of the derived block-based disocclusion map that has been marked as disoccluded, temporally by keeping said area marked as disoccluded for a certain duration even if said area is no longer disoccluded, and
  code the three-dimensional (3D) video by using the extended block-based disocclusion map.

19. The decoder of claim 18, the software further comprising program code that, when run in the processor, causes the decoder to reduce the resolution of the derived block-based disocclusion map such that it matches the block structure of the video codec used.

20. The decoder of claim 18, the software further comprising program code that, when run in the processor, causes the decoder to spatially extend the area of the derived block-based disocclusion map by extending said area with at least one block.

21. The decoder of claim 20, the software further comprising program code that, when run in the processor, causes the decoder to spatially extend the area of the derived block-based disocclusion map with an equal number of blocks in all directions from the disoccluded area.

22. The decoder of claim 20, the software further comprising program code that, when run in the processor, causes the decoder to spatially extend the area of the derived block-based disocclusion map based on an estimation of the likelihood for having an artifact in a certain direction and weight the extension of blocks accordingly.

23. A view synthesis apparatus for creating a disocclusion map used for coding a three-dimensional (3D) video, the view synthesis apparatus comprising an encoder, a decoder, a processor and a non-transitory memory storing software comprising computer program code that, when run in the processor, causes the view synthesis apparatus to:
  receive, from a disocclusion detection system, a pixel-based disocclusion map in which pixels are marked either as disoccluded or not,
  derive a block-based disocclusion map based on the pixel-based disocclusion map,
  extend an area of the derived block-based disocclusion map that has been marked as disoccluded, temporally by keeping said area marked as disoccluded for a certain duration even if said area is no longer disoccluded, and
  code the three-dimensional (3D) video by using the extended block-based disocclusion map.

24. The view synthesis apparatus of claim 23, the software further comprising program code which, when run in the processor, causes the view synthesis apparatus to reduce the resolution of the derived block-based disocclusion map such that it matches the block structure of the video codec used.

25. The view synthesis apparatus of claim 23, the software further comprising program code which, when run in the processor, causes the view synthesis apparatus to spatially extend the area of the derived block-based disocclusion map by extending said area with at least one block.

26. The view synthesis apparatus of claim 25, the software further comprising program code which, when run in the processor, causes the view synthesis apparatus to spatially extend the area of the derived block-based disocclusion map with an equal number of blocks in all directions from the disoccluded area.

27. The view synthesis apparatus of claim 25, the software further comprising program code which, when run in the processor, causes the view synthesis apparatus to spatially extend the area of the derived block-based disocclusion map based on an estimation of the likelihood for having an artifact in a certain direction and weight the extension of blocks accordingly.

28. The view synthesis apparatus of claim 23, wherein the encoder is configured to assign a bit rate according to the extended block-based disocclusion map so as to encode disoccluded areas with high fidelity and to encode non-disoccluded areas with low fidelity.

29. The view synthesis apparatus of claim 23, wherein the encoder and decoder both comprise pre-agreed disocclusion detection parameters.

30. The view synthesis apparatus of claim 23, wherein the encoder is configured to select disocclusion detection parameters and transmit these parameters to the decoder dynamically.

31. The view synthesis apparatus of claim 30, wherein the encoder is configured to transmit the disocclusion detection parameters once per video sequence or once for each video frame.

32. The view synthesis apparatus of claim 30, wherein the encoder is configured to transmit the disocclusion detection parameters in a Supplemental Enhancement Information (SEI) message.

* * * * *